United States Patent Office 3,557,172
Patented Jan. 19, 1971

3,557,172
METHOD FOR THE PREPARATION OF CYCLOHEXYLTIN TRIHALIDE
Horst G. Langer, Wayland, and Thomas P. Brady, Framingham, Mass., assignors to The Dow Chemical Company, Midland, Mich., a corporation of Delaware
No Drawing. Filed July 31, 1968, Ser. No. 748,949
Int. Cl. C07f 7/22
U.S. Cl. 260—429.7          5 Claims

ABSTRACT OF THE DISCLOSURE

Disclosed is a new method of preparing cyclohexyltin trihalide wherein the halide is bromide or chloride which involves the direct halogenation with bromine or chlorine of tetracyclohexyltin, tricyclohexyltin monohalide, or dicyclohexyltin dihalide or mixtures thereof. Cyclohexyltin tribromide and cyclohexyltin trichloride are useful as pesticides.

---

This invention relates to a new and useful process in organometallic chemistry and to certain useful products thereof derived. More specifically, the present invention is directed at the preparation of cyclohexyltin tribromide and cyclohexyltin trichloride which compounds are useful as pesticides.

BACKGROUND OF THE INVENTION

Many organotin trihalides have not been previously prepared primarily because via currently known processes this result is either impossible or greatly suffers from improbable success. In fact, many now known processes are actually mechanistically or otherwise directed away from the formation of the tri-halogenated tin species; other, perhaps more spatially advantageous or preferred products, such as the mono-, di-, and tetra-halogenated tin compounds, being formed. In view of this situation, the preparation of the tri-halogenated organotin compounds presently result from redistribution reactions with metal salt halogenating agent, particularly, stannic tetrachloride.

SUMMARY OF THE INVENTION

The present invention is directed to a process for the production of cyclohexyltin trihalide which comprises halogenating tetracyclohexyltin, tricyclohexyltin monohalide, or dicyclohexyltin dihalide or mixtures thereof with halogenating agent, wherein halide is bromo or chloro. This novel process can thus be represented by the following equation:

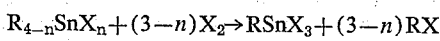

$$R_{4-n}SnX_n + (3-n)X_2 \rightarrow RSnX_3 + (3-n)RX$$

In this and succeeding formulas, R represents the cyclohexyl radical, each X represents bromo or chloro, and $n$ is the integer 0, 1 or 2. The halogenating agent for this process is thus bromine or chlorine, and byproduct is cyclohexyl bromide or cyclohexyl chloride.

The cyclohexyltin trihalide compounds hereof, cyclohexyltin tribromide and cyclohexyltin trichloride, are liquids at room temperature. They are soluble in certain organic solvents and readily hydrolyze in contact with water. These compounds are useful as pesticides in the control and kill of a wide variety or organisms including fungal and plant pests such as *Bacillus subtilis*, *Mycobacterium phlei*, pigweeds, beans, and so forth.

DETAILED DESCRIPTION AND PREFERRED EMBODIMENTS

Essential and critical for the practice of the present invention by which the cyclohexyltin trihalides hereof are prepared is the temperature at which the halogenation with halogenating agent, namely bromine or chlorine, is conducted. The reaction is carried out at temperatures at least sufficient to produce halogenation. Generally, temperatures of from about 0° C. to 100° C. and, preferably, from about room temperature to about 80° C. are employed. The halogenation with bromine is further preferred at temperatures ranging from room temperature up to about 50° C. At temperatures lower than about 0° C., the conversion rate is substantially reduced. Temperatures higher than about 100° C. should not be employed for any appreciable period of time as they result in the formation of substantial amounts of other byproducts.

The halogenation is conveniently conducted in an inert organic liquid as reaction medium. Suitable media include hexachlorobutadiene, the dichlorobenzenes, 1,2,3-trichlorobenzene, 1,2,4-trichlorobenzene, 1,3,5-trichlorobenzene, methylene chloride, chloroform, and carbon tetrachloride. Carbon tetrachloride is preferred. The reactants are contacted in any convenient manner and such contacting and halogenation is conducted within the temperature range given above for a period of time sufficient to produce the product.

The rate of formation of the cyclohexyltin trihalide product depends directly upon the employed temperature, longer periods being employed at the lower temperatures. Maximum conversions of starting materials are obtained in periods from 2 to 24 hours.

The desirable results of the present invention are obtained when the halogenation is carried out with any substantial amount of halogenating agent; however, it is usually preferred from the standpoint of economy to use enough halogenating agent to effect the maximum conversion to cyclohexyltin trihalide. Depending upon the choice of starting material, the reaction consumes one, two, or three molecular proportions of halogenating agent for each molecular proportion of starting compound. Thus, in the use of dicyclohexyltin dihalide, tricyclohexyltin monohalide, and tetracyclohexyltin the reaction respectively consumes one, two, and three moles of halogenating agent. Usually the molecular amount of halogenating agent employed substantially corresponds to that consumed in the reaction. In a preferred procedure, the halogenating agent is employed in an amount in excess of that consumed in the reaction mixture, the excess serving to ensure completeness of reaction.

In carrying out the reaction, halogenating agent is conveniently contacted, optionally as a solution thereof in organic liquid reaction medium, with starting cyclohexyltin material optionally dispersed in a (further) portion of organic liquid reaction medium. The addition is carried out with an amount of halogenating agent at least sufficient substantially to provide for its consumption in the reaction. The addition is accomplished preferably with stirring and at a temperature of from 0° C. to 100° C. The reaction is conveniently carried out in a reaction vessel resistant to corrosion by chlorine or bromine. Glass or silica vessels lined with glass or silica are suitable. Upon completion of the contacting and halogenation, the reaction mixture containing cyclohexyl trihalide product is utilized per se as a pesticidal composition or is conventionally treated to separate and isolate the desired cyclohexyltin trihalide product.

One convenient manner by which such separation and recovery can be achieved involves first removing the byproduct cyclohexyl halide and any reaction medium from the reaction mixture through vacuum distillation conducted at a temperature within the reaction temperature range. The residue remaining after such vacuum distillation which contains cyclohexyltin trihalide product is then subjected to hydrolysis. Such hydrolysis conveniently follows by the addition of an aqueous ammonia solution to the vacuum distilled reaction mixture. In this manner, the cyclohexyltin trihalide product is converted to cyclohexylstannoic acid (RSnOOH). This acid precipitates as a solid in the aqueous alkaline solution. At the same time, any other cyclohexyltin halides present in the residue remaining after vacuum distillation are converted to and precipitated as their respective oxides. Cyclohexylstannoic acid is then selectively extracted by the treatment of the precipitated solids with dilute aqueous hydrogen chloride. In this procedure, the precipitated acid and oxides are preferably isolated as a group, such as through filtration, and thereafter treated with dilute aqueous hydrogen chloride which selectively dissolves the cyclohexylstannoic acid component by the conversion thereof to cyclohexyltin trichloride. The resulting solution containing cyclohexyltin trichloride is then filtered to separate the oxides. Aqueous ammonia is added to the filtrate to separately reprecipitate cyclohexylstannoic acid. The precipitated cyclohexylstannoic acid is then reconverted to the corresponding cyclohexyltin trihalide product by dissolving it in aqueous hydrogen chloride or hydrogen bromide. Thereafter, conventional techniques, such as extraction with a solvent, for example carbon tetrachloride, chloroform, and so forth, followed by evaporation of extract solvent isolates the respective cyclohexyltin trihalide product.

The following examples illustrate the present invention but are not to be construed as limiting same.

EXAMPLE 1

Tricyclohexyltin bromide (9.0 grams; 0.020 mole) is dispersed in 50 milliliters of carbon tetrachloride with stirring at room temperature and the resultant solution is cooled to ice bath temperatures. A solution of 6.24 grams (0.039 mole) of bromine dispersed in 50 milliliters of carbon tetrachloride is added dropwise to the cooled solution with stirring. The resultant mixture is then allowed to warm to room temperature and is stirred under these conditions for about 16 hours. A portion of the reaction is analyzed by infrared spectroscopy and found to contain cyclohexyltin tribromide product. This portion gives good controls and kills the organisms *Bacillus subtilis,* Bacterium acid fast, pigweeds, beans, and Southern army worm when applied in pesticidal amounts thereto.

The remainder of the reaction mixture containing cyclohexyltin tribromide product is vacuum distilled at from about 20° C. to about 100° C. under pressures of from about 10 millimeters to about 12 millimeters Hg to remove cyclohexyl bromide and carbon tetrachloride. Aqueous ammonia is added portionwise to the residue remaining after vacuum distillation, which contains cyclohexyltin tribromide product, until precipitation is initiated and becomes complete. This precipitate contains the oxides of the cyclohexyltin halides present as well as cyclohexylstannoic acid. The precipitate is removed by filtration and is then stirred a few minutes at room temperature with a 10 percent aqueous hydrogen chloride solution. The resultant mixture is filtered to separate the oxides and recover cyclohexyltin trichloride in solution. Aqueous ammonia is added portionwise to the filtrate until precipitation of cyclohexylstannoic acid is complete. This precipitate is then removed by filtration and dissolved in an aqueous hydrogen bromide solution to reproduce the cyclohexyltin tribromide product. The resultant solution is extracted with successive portions of carbon tetrachloride. The extracts are combined and evaporated to obtain the desired cyclohexyltin tribromide product as a yellow oil in a yield of 53 percent based upon the amount of tricyclohexyltin chloride employed. Cyclohexyltin tribromide has a molecular weight of 441.60.

EXAMPLE 2

Tricyclohexyltin chloride (8.1 grams; 0.020 mole) is dissolved in 100 milliliters of carbon tetrachloride at room temperature. The resultant solution is then heated to the boiling point. While maintaining the solution at the boiling point and under reflux, gaseous chlorine is continuously introduced into the solution at a rate sufficient to produce agitation. This addition is carried out over a period of two hours at about 0.025 mole per hour. Following the addition, the reaction mixture which contains cyclohexyltin trichloride product is concentrated by vacuum distillation gradually from a temperature of 20° C. to 50° C. and under pressures of from 10 millimeters to 12 millimeters Hg to remove low boiling constituents. Aqueous ammonia is added to the remainder, which contains cyclohexyltin trichloride product, until precipitation of cyclohexylstannoic acid and other constituents as oxides is complete. The mixture is filtered and the precipitate stirred with a 10 percent aqueace hydrogen chloride solution for a few minutes at room temperature. The resultant mixture is filtered and the filtrate is neutralized by the addition of aqueous ammonia until precipitation of cyclohexylstannoic acid occurs and is complete. The precipitate is removed by filtration and dissolved in an aqueous hydrogen chloride solution to produce the cyclohexyltin trichloride product. The resultant solution is extracted successively with carbon tetrachloride. The extracts are combined and the solvent recovered by evaporation to obtain the desired cyclohexyltin trichloride product as a yellow oil which freezes at from 10° C. to 15° C. and boils at 160° C. (with recomposition). This product gives good control and kills of the organisms two spotted spider mite, *Straphylococcus aureus, Bacillus subtilis,* Bacterium acid fast, and pigweeds when applied in pesticidal amounts thereto.

EXAMPLE 3

Tetracyclohexyltin (4.5 grams; 0.010 mole) is reacted with bromine (4.8 grams; 0.030 mole) as set forth in Example 1 to produce the cyclohexyltin tribromide product.

EXAMPLE 4

Dicyclohexyltin dichloride (3.56 grams; 0.0100 mole) is reacted together with chlorine (2.13 grams; 0.0300 mole) exactly as set forth in Example 2 to produce the cyclohexyltin trichloride product.

EXAMPLE 5

Dicyclohexyltin dichloride (0.71 gram; 0.0020 mole) is cooled to ice bath temperature. Two small drops of bromine are allowed to react on the surface of the cooled crystals. During this reaction, cooling is interrupted and the mixture is allowed to warm to room temperature. After attaining such, additional bromine is added to the mixture to a total of 0.2 milliliter (0.004 mole). The resultant mixture is then heated at 50° C. for one hour. The reaction mixture, which contains cyclohexyltin tribromide, is then processed as described in Examples 1 and 2 to isolate and recover the cyclohexyltin tribromide product.

What is claimed is:

1. The process for the production of cyclohexyltin trihalide which comprises halogenating a member selected from the group consisting of tetracyclohexyltin, tricyclohexyltin monohalide, and dicyclohexyltin dihalide or mixtures thereof with bromine or chlorine as halogenating agent at a cyclohexyl halide byproduct-liberating temperature and in amount sufficient to form cyclohexyltin trihalide, wherein halide is, respectively, bromo or chloro.

2. The process claimed in claim 1 wherein cyclohexyltin trichloride is produced by halogenating tricyclohexyltin chloride with chlorine.

3. The process claimed in claim 1 wherein cyclohexyltin tribromide is produced by halogenating tricyclohexyltin bromide with bromine.

4. The process claimed in claim 1 wherein the reaction is conducted at a temperature of from 0° C. to 100° C.

5. The process claimed in claim 1 including the step of recovering the cyclohexyltin trihalide product from the reaction mixture.

References Cited

Hirschland et al., Metal-Organic Compounds (1959), ACS, #23, pp. 207–8.

Rubinchik et al., Zhurnal Obshei Khimii (1966), vol. 36, No. 7, pp. 1301–04.

TOBIAS E. LEVOW, Primary Examiner

W. F. W. BELLAMY, Assistant Examiner

U.S. Cl. X.R.

424—288